US005413877A

United States Patent [19]

Griffith

[11] Patent Number: 5,413,877

[45] Date of Patent: May 9, 1995

[54] COMBINATION THERMAL BARRIER AND WEAR COATING FOR INTERNAL COMBUSTION ENGINES

[75] Inventor: Michael J. Griffith, Davis, Calif.

[73] Assignee: Moller International, Inc., Davis, Calif.

[21] Appl. No.: 948,326

[22] Filed: Sep. 22, 1992

[51] Int. Cl.$^{6}$ .................... B32B 9/00

[52] U.S. Cl. .................... 428/698; 428/457; 428/699; 428/701; 428/702; 384/907; 384/907.1; 384/913

[58] Field of Search .............. 428/698, 688, 699, 701, 428/702, 469, 471, 472, 472.2, 472.3, 623, 627, 630, 632, 633, 457; 384/907, 907.1, 913

[56] References Cited

U.S. PATENT DOCUMENTS 5,139,876 8/1992 Graham .................... 428/698

5,164,266 11/1992 Kita .................... 428/698

*Primary Examiner*—Ellis P. Robinson

*Assistant Examiner*—Timothy M. Speer

*Attorney, Agent, or Firm*—Claude A. S. Hamrick

[57] ABSTRACT

A thermal barrier and wear coating having high strength, low conductivity, a low thermal expansion coefficient and good adhesion qualities, where the wear coating is self-lubricating and has high temperature resistance, a hard wear resistant matrix, a low coefficient of friction and is easy to machine to a smooth surface. The thermal barrier is applied to the internal engine cylinder surface to reduce the heat rejection and thus reduce the need for air or liquid cooling. The self-lubricating wear coating is applied over the thermal barrier to prevent contact between the moving engine parts and the thermal barrier. The wear coating has a low friction coefficient so that it does not generate substantial additional heat and is self-lubricating to withstand temperatures up to 900° C.

12 Claims, 2 Drawing Sheets

COMBINATION THERMAL BARRIER AND WEAR COATING FOR INTERNAL COMBUSTION ENGINES

BACKGROUND OF THE INVENTION

1. Field of the Invention

This invention relates generally to heat tolerant and wear resistant coatings for internal combustion engines, and more particularly to a combination of a thermal barrier layer and a wear-resistant layer providing an improved coating for the cylinder walls of internal combustion engines, where the wear coating is self-lubricating to reduce wear on the coated engine parts, and can withstand high operating temperatures.

2. Brief Description of the Prior Art

Inadequate cooling of an engine is a limiting factor as to how much power can be consistently produced by the engine. Therefore, the amount of heat conductively transferred from the engine's working chamber (piston/cylinder or rotor/rotor housing) to the engine's cooling system is preferably kept to a minimum so that the cooling system can adequately remove the conducted heat and maintain the engine at an acceptable operating temperature. Low heat rejection engines have used ceramic insulating coatings to contain the combustion energy within the working chamber of the engine. Many different types of ceramics have been experimented with in an effort to get reasonable wear characteristics in addition to the thermal protection provided by the insulating coating. Recent developments in the adiabatic engine, such as those disclosed in S.A.E. publication SP-738 dated 1988, illustrate the use of ceramics as thermal insulators for engine parts. Although these ceramics are good insulators, they are not good wear surfaces and the roughness of the ceramic surface is ground down by friction rather quickly.

Although ceramic thermal barrier coatings have been very successful at reducing heat transfer through the engine housing, in doing so they have raised the temperature of the internal engine surfaces above the capability of any lubricant to maintain a lubricating film. Recently, some high temperature, self-lubricating materials have been developed for applications where the temperature exceeds the capability of known lubricants. One example is NASA PS-200 self-lubricating composite coating developed by NASA and consisting of a nickel alloy-bonded chromium carbide (or silicon carbide) matrix with dispersed particles of silver and calcium fluoride-barium fluoride eutectic. The silver and fluorides form low shear strength films on sliding surfaces. The silver provides lubrication up to 500° C. and the fluoride eutectic, which undergoes a brittle to ductile transition at temperatures above 500° C., provides lubrication from 500° C. to 900° C.

There is a complex problem, however, with finding a thermal barrier coating and a self-lubricating wear coating that are compatible with one another and can be applied to the working parts of an engine economically and practically.

SUMMARY OF THE INVENTION

It is therefore a primary objective of the present invention to provide a compatible combination of a thermal barrier material and a wear protection material to provide an improved cylinder wall coating for reducing the cooling load on air or liquid cooled engines.

Another objective of the present invention is to reduce the heat rejected from the working chamber of an internal combustion engine.

A further objective of the present invention is to provide an improved wear coating for improving the wear characteristics of combustion chamber surfaces.

Still another objective of the present invention is to eliminate the need for continuous lubrication of the cylinder walls of an engine.

Still a further objective of the present invention is to eliminate the need to consider the wear resistance of the thermal barrier material, thus providing a greater selection of thermal barrier coating materials that can be used.

Still another objective is to provide a means for allowing the piston rings or sliding seals to reduce their temperature as they move over a part of their travel path.

Briefly, a preferred embodiment of the present invention includes the combination of a thermal barrier coating having high strength, low conductivity, a low thermal expansion coefficient and good adhesion qualities, with a self-lubricating wear coating that has high temperature resistance, a hard wear resistant matrix, a low coefficient of friction and is easy to machine to a smooth surface to provide an improved cylinder wall surface for internal combustion engines. The thermal barrier is first applied to the internal surface of the engine cylinder to reduce the heat flow and thus the need for air or liquid cooling. The self-lubricating wear coating is then applied over the thermal barrier to prevent contact by the moving engine parts with the thermal barrier, as the thermal barrier is not wear resistant. The wear coating has a low friction coefficient and thus does not generate substantial additional heat as a consequence of its engagement by the engine's pistons.

An important advantage of the present invention is that it provides an insulating thermal barrier having a self-lubricating wear coating that maintains surface wear and friction at acceptable levels.

Another advantage of the present invention is that it reduces the heat rejected from the working chamber of an internal combustion engine to the engine's cooling system and thus improves engine efficiency.

A further advantage of the present invention is that it provides a cylinder wall coating having improved wear characteristics.

Still another advantage of the present invention is that it eliminates the need for continuous lubrication of the engine's cylinder walls.

Still a further advantage of the present invention is that it eliminates the need to consider the wear resistance of the thermal barrier material to be used, thus providing a greater selection thereof.

Yet another advantage of the present invention is that it provides a means for reducing the temperature of the piston rings or sliding seals sufficient to prevent lubrication breakdown in the ring or seal slots.

These and other objects and advantages of the present invention will no doubt become apparent to those skilled in the art after having read the following detailed description of the preferred embodiment which is illustrated by the various drawing figures.

DETAILED DESCRIPTION OF THE BEST MODE

The preferred embodiment of the present invention combines the prior thermal barrier technology with the recently developed high temperature, self-lubricating wear materials, resulting in a successful composite coating for engine wear surfaces having the advantages of both.

In choosing the material make-up of the thermal barrier portion of the present invention, the desirable characteristics are 1) low thermal conductivity (e.g., less than 10 BTU.ft/hr.ft$^{2}$.° F., 2) low thermal expansion coefficient, 3) good adhesion to the base material and 4) high strength maintenance at elevated temperatures. Some examples of desirable thermal barrier materials are zirconia and silicon oxide.

The desirable characteristics for the wear coating portion of the present invention are 1) low coefficient of friction (e.g., less than 0.20), 2) easy to machine to a smooth surface, 3) high temperature resistance, 4) capability of forming a compliant film at the surface to avoid asperities contacting the engine part rubbing on the surface, and 5) a hard, wear resistant matrix to support the compliant film so it is not wiped away. An example of a desirable wear coating material is NASA PS-200 self-lubricating coating originally used for turbine bearings and Stirling engines where wall/piston ring lubrication is impossible.

In order to combine the two technologies one must find two coatings—a thermal barrier and a self-lubricating wear coating—which are compatible with one another and can be applied economically enough to make them practical. One such combination is NASA PS-200 self-lubricating wear coating combined with zirconia, a good thermal barrier that has very poor wear resistance. Both coatings can be applied by plasma arc spraying to conventional engine component materials and will adhere well to the base material and to each other. In the following discussion, zirconia and NASA PS-200 self-lubricating coating will be used as examples of a thermal barrier and a wear coating, respectively, and this use is meant to assist the discussion of the present invention only, and not to limit the scope of the invention. It is anticipated that one skilled in the art will recognize that other materials and other application techniques can be used so long as the materials are compatible with each other and with the application technique being used.

Figure 1:
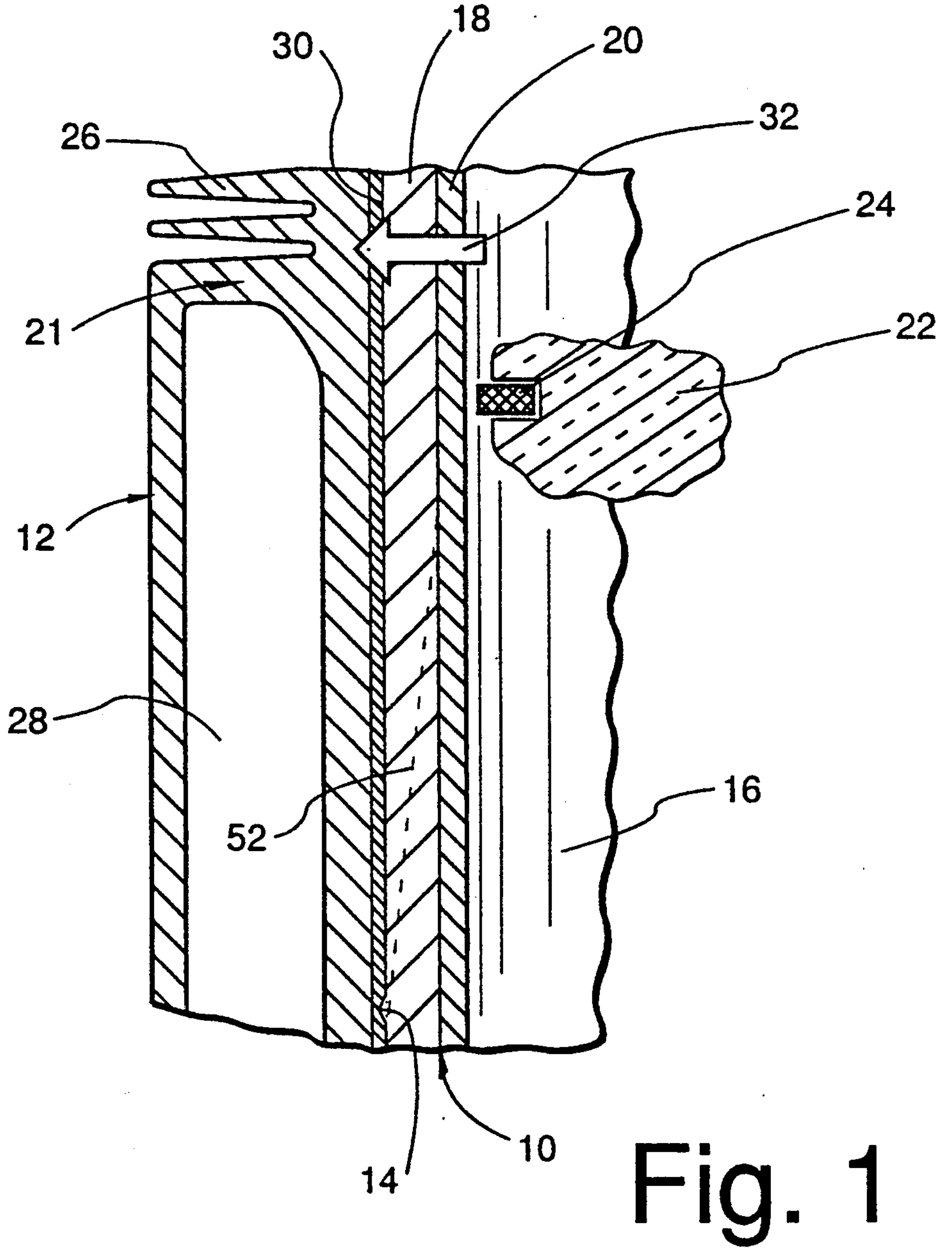
FIG. 1 is a broken, partial cross-sectional view of an engine housing, cylinder and piston, including a thermal barrier/wear coating combination disposed on the inner wall of the cylinder in accordance with a preferred embodiment of the present invention.

Generally, FIG. 1 illustrates a cross section of a partial engine housing 12 where the bored or machined surface 14 forming a cylinder 16 includes a composite coating 10 applied thereto in accordance with the present invention. The composite coating is comprised of a thermal barrier layer 18 adhered to the surface 14, and a self-lubricating wear layer 20 disposed atop the layer 18. Also shown in partial cross-section is a piston 22 having a piston ring 24 that frictionally engages the wear layer 20. Alternatively, the depicted piston and ring could be the rotor and apex seal of a rotary engine.

More specifically, the engine housing is shown to include a cooling system 21 having both fins 26, for air cooling the engine housing 12, and an internal chamber 28 through which heat-absorbing liquid will be caused to flow to liquid-cool the engine. The cooling system 21 will dissipate and absorb the combustion energy that is conducted through the composition coating 10.

The surfaces 14 must be prepared prior to application of the thermal barrier coating 18. Most engine component materials are either aluminum or iron based. To enhance coating adhesion, the surface 14 should be grit blasted with small, angular grit, then cleaned to remove any particles of metal or grit prior to coating. The metal housing should also be pre-heated to a temperature above any which is anticipated in operation so that differential thermal expansion will keep the coating to be applied in compression at all times. Just prior to applying the thermal barrier coating layer 18, a bonding agent 30 may be applied to the prepared surface 14. By way of example only, a thin (i.e., 0.001") bond coat of a molybdenum, chromium, aluminum and yttrium composition applied to an aluminum surface will enhance the adhesion of the thermal barrier (to be applied) to the surface.

The material comprising the thermal barrier 18 can be selected from a wide variety of possible coating materials because the barrier's wear resistance need not be considered. Zirconia is a typical type of ceramic that is used for thermal barriers and will be used as an example for layer 18 in this specification. The zirconia is preferably partially stabilized with a small percentage of yttrium oxide, and is then plasma-flame sprayed onto the heated and prepared surface 14. A robotically controlled plasma gun is most desirable to maintain optimum spray technique, constant distance and a perpendicular spray at all times. The thickness of the zirconia is dependent on the amount of insulation required, balanced against the structural integrity of the coating. Generally, a 0.02" layer of zirconia is desirable.

There is no need for any intermediate process between the application of the zirconia layer 18 and the wear coating 20, but the coating 20 should be applied as soon after the zirconia layer as is practical to avoid any possibility of contaminating the surface of the zirconia. An example of a suitable wear coating 20 that is compatible with zirconia is PS-200, a NASA developed, self-lubricating coating. The NASA PS-200 self-lubricating coating should be applied with plasma parameters optimized for that coating. This will vary from the plasma parameters for the layer of zirconia. The NASA PS-200 self-lubricating coating is applied sufficiently to cover all asperities of the zirconia and to permit finishing of the NASA PS-200 self-lubricating coating to a smooth finish without exposing the zirconia. Generally, a 0.01" thick layer of NASA PS-200 self-lubricating coating will be applied.

The wear coating layer 20 must be finished to a smooth (for example 10 microns or less) finish, which can be accomplished by grinding, lapping or honing. Grinding requires the use of a wheel harder than any of the wear elements in the coating so that it cuts cleanly. This may require a "rough" and "finish" process with two different wheels. Lapping can be accomplished using a cast iron lap with alcohol as a flushing medium to carry away the debris. Lapping is most applicable to flat surfaces. Honing is most appropriate for internal, curved surfaces, as it is non-shape-sensitive. Sufficient hone stone pressure must be maintained to cut, but the surface must be well flushed to avoid scratches from debris. Hone stones should be perpendicular to the surface, and should be loaded to stay in contact at all times. Both axial and rotary motion of the stones is important to keep them cutting clean and evenly.

In operation, as the piston 22 moves vertically within the cylinder 16, heat energy is generated within the cylinder and is conductively transferred to the cooling system 21, in the direction shown by the arrow 32. However, the majority of the heat energy is prevented from reaching the cooling system 21 by the thermal barrier layer 18. The wear coating layer 20 prevents contact between the piston ring 24 and the thermal barrier layer 18. The self-lubricating features of the coating 20 must perform at elevated temperatures, above those at which conventional lubricants may be used (over 600 degrees Fahrenheit) because the heat generated within the cylinder 16, as well as that caused by piston ring friction, makes the wear coating material surface very hot. The low coefficient of friction of the wear coating inhibits wear of the piston ring 24 and substantially reduces the heat normally generated by frictional contact between the piston ring 24 and the wear coating.

Although the piston 22, piston ring 24 and cylinder 16 are used in the aforementioned example, it is anticipated that any frictionally engaging machine parts requiring control of thermal conductivity, such as a rotor and rotor housing for example, or perhaps a bearing device in which the frictional or dimensional characteristics are optimum or desirable at an elevated temperature, will benefit from the inclusion of the thermal barrier/-wear coating of the present invention on at least one surface of the working parts.

In the case of a rotary engine, a secondary benefit can be achieved using the present invention. By selectively applying the ceramic coating to the walls of the combustion chamber only in the hot areas of the center and end housings, the seals will have a chance to reduce their temperature as they pass over the uncoated and cooled surfaces. This makes it possible to keep the seals at a sufficiently low temperature to prevent lubrication breakdown in the slots (through coking, since it may be impossible to avoid getting some oil into the combustion chamber).

Figure 2:
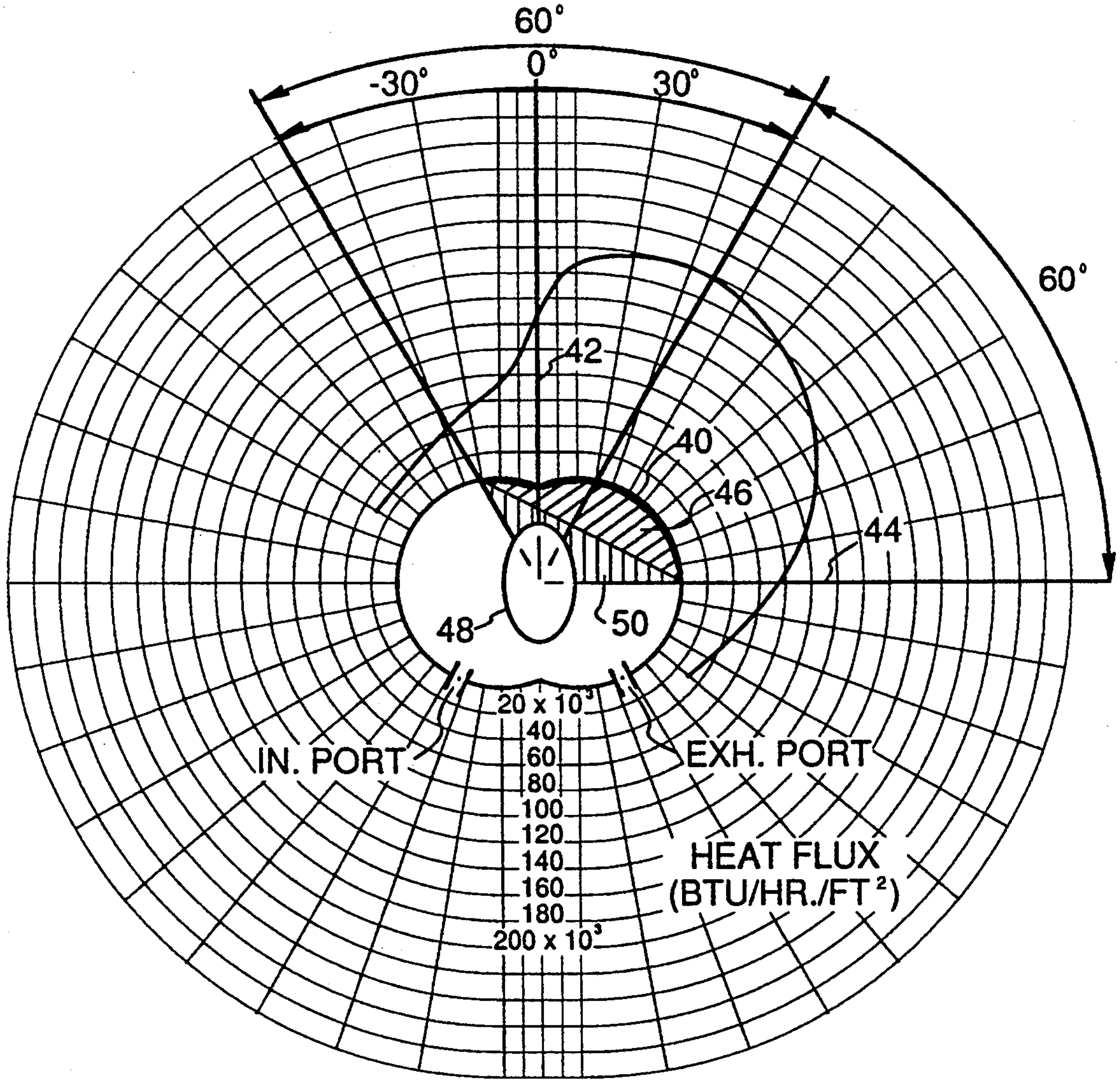
FIG. 2 is a heat flux distribution plot for the chamber walls forming a rotary engine combustion chamber prior to coating with the thermal barrier/wear coating of the present invention.

The ceramic is applied by computer and as such can be tapered from maximum thickness at maximum heat flux to zero thickness outside the combustion area. The operational heat flux plot of the walls of an identical engine not having a ceramic coating is shown in FIG. 2 and is used as a basis for establishing the approximate patterns of ceramic coating thickness to be laid down on the walls of the trochoid housing, i.e., the maximum thickness (1 mm+) would be used at the point of maximum heat flux and the coating would decrease to either side. The solid lubricant is applied uniformly on all surfaces, both coated and uncoated. More specifically, using the minor axis 42 of the trochoid 40 as 0°, the maximum thickness is applied at 30°, and the thickness is decreased to zero thickness at 90° (the major axis 44). On the other side (of 30°) the thickness is decreased to zero, or near zero, at −30°. On the end housings a coating, as shown by the cross-hatched area 46, covers the area exposed to combustion temperatures. In practice, however, one would normally coat the entire 120° area up to the edge of the football-shaped opening 48, as indicated by the shaded area 50. In these end wall areas the thickness of the ceramic layer likewise tapers from maximum at +30° to substantially zero at −30° and 90°.

The net result leads to a more uniform temperature distribution around the housing; i.e., reduced on combustion side, increased on intake side. This provides a pollution benefit by reducing fuel-air mixture quenching and by helping maintain a more consistent set of engine clearances for seals, etc. Reducing blow-by and other gas leakage by better clearance control also contributes to pollution control.

Although the present invention has been described above in terms of specific embodiments, it is anticipated that other embodiments and alterations and modifications thereof will no doubt become apparent to those skilled in the art. For example, there may be reciprocating piston engine embodiments in which the thickness of the ceramic coating 18 would be tapered to a lesser thickness, as suggested by the dashed lines 52 in FIG. 1, or even reduced to zero, in the lower portions of the cylinders for the same or similar reasons as those set forth above with regard to the rotary engine embodiment. It is therefore intended that the following claims be interpreted as covering all such alterations and modifications as fall within the true spirit and scope of the invention.

What is claimed is:

1. A protective coating for friction-bearing combustion chamber wall surfaces of an internal combustion engine, said protective coating having low thermal expansion coefficient, good adhesion to the base material, and high strength maintenance at elevated temperatures, comprising:

a first thermal barrier material layer of ceramic material having a thermal conductivity of greater than 0.0 and less than 10 BTU.ft/hr.ft$^{2}$·° F., said first material layer being affixed to said wall surface; and a second self-lubricating wear layer of material including a nickel alloy-bonded chromium carbide matrix having particles of silver and calcium fluoride-barium fluoride eutectic dispersed within, said eutectic having a coefficient of friction of greater than 0.0 and less than 0.20, said second wear layer being affixed to said first material layer; and said first material layer and said second wear layer having similar thermal expansion properties such that they expand and contract jointly.

2. A protective coating as recited in claim 1 wherein said second wear layer has high temperature integrity, such that its structural characteristics remain unaffected above 600 degrees F., up to a temperature of approximately 900 degrees F.

3. A protective coating as recited in claim 1 wherein said first material layer is made from zirconia.

4. A protective coating as recited in claim 1 further including a bond coat for adhering said first material layer to said combustion chamber wall surfaces.

5. A protective coating as recited in claim 4 wherein said bond coat for adhering is a composition of molybdenum, chromium, aluminum and yttrium.

6. A protective coating as recited in claim 1 wherein the thickness of said first material layer is proportional to the operational heat flux distribution characteristic the engine wall would have absent said first material layer.

7. A friction-bearing machine surface having a protective coating thereon, said protective coating having low thermal expansion coefficient, good adhesion to the base material, and high strength maintenance at elevated temperatures, comprising:

a friction-bearing machine surface;

a first thermal barrier material layer of a ceramic material having thermal conductivity of greater than 0.0 and less than 10 BTU.ft/hr.$ft^{2}$.° F. and affixed to said machine surface;

a second self-lubricating wears layer of material, including a nickel alloy-bonded chromium carbide matrix having particles of silver and calcium fluoride-barium fluoride eutectic dispersed within, said eutectic having a coefficient of friction of greater than 0.0 and less than 0.20 and affixed to said first material layer; and said first material layer and said second wear layer having similar thermal expansion properties such that they expand and contract jointly.

8. A machine surface as recited in claim 7 wherein said second wear layer has high temperature integrity, such that its structural characteristics remain unaffected above 600 degrees F., up to a temperature of approximately 900 degrees F.

9. A machine surface as recited in claim 7 wherein said first material layer is made from zirconia.

10. A machine surface as recited in claim 7 further including a bond coat for adhering said first material layer to said machine surface.

11. A machine surface as recited in claim 7 wherein the thickness of said first material layer is proportional to the heat flux distribution characteristic the wall forming the machine surface would have absent said first material layer.

12. A machine surface as recited in claim 10 wherein said bond coat for adhering is a composition of molybdenum, chromium, aluminum and yttrium.

* * * * *